(12) United States Patent
Kakuta et al.

(10) Patent No.: US 6,630,944 B1
(45) Date of Patent: Oct. 7, 2003

(54) DISPLAY CONTROL METHOD AND DEVICE

(75) Inventors: Jun Kakuta, Kawasaki (JP); Satoshi Okuyama, Kawasaki (JP); Ai Manabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/468,936

(22) Filed: Dec. 22, 1999

(30) Foreign Application Priority Data

Mar. 19, 1999 (JP) .......................................... 11-075343

(51) Int. Cl.⁷ ................................................ G09G 5/00
(52) U.S. Cl. ...................................................... 345/758
(58) Field of Search ................................ 345/758, 752, 345/753, 757, 799; 709/204–206

(56) References Cited

U.S. PATENT DOCUMENTS

| | | | | |
|---|---|---|---|---|
| 5,793,365 A | * | 8/1998 | Tang et al. | 345/758 |
| 5,880,731 A | * | 3/1999 | Liles et al. | 345/473 |
| 5,956,491 A | * | 9/1999 | Marks | 709/250 |
| 6,014,136 A | * | 1/2000 | Ogasawara et al. | 345/758 |
| 6,212,548 B1 | * | 4/2001 | DeSimone et al. | 709/204 |
| 6,256,663 B1 | * | 7/2001 | Davis | 709/204 |
| 6,336,133 B1 | * | 1/2002 | Morris et al. | 345/758 |
| 6,345,290 B2 | * | 2/2002 | Okada et al. | 709/203 |
| 6,370,563 B2 | * | 4/2002 | Murakami et al. | 709/205 |
| 6,393,461 B1 | * | 5/2002 | Okada et al. | 709/203 |

* cited by examiner

*Primary Examiner*—Sy D. Luu
(74) *Attorney, Agent, or Firm*—Staas & Halsey LLP

(57) ABSTRACT

The disclosure is directed to methods and devices for displaying conversations on a network for ease of viewing in accordance with user preferences. Based on thread (message-group) forming instructions from users, as well as on member users' instructions, threads are created from member users' remarks. Instead of designating users, remarks that include threads may be designated. Thread information relating to the created threads is at the same time created and stored. The thread information includes predetermined information such as thread IDs, member users and authors. The created thread information is reported to other users in the network, and is in common with thread information within the network. Remarks within a thread may be displayed in a thread window 307 only, or displayed in both it and a conversation window 303, configurable to suit according to user instructions.

20 Claims, 20 Drawing Sheets

SCREEN EXAMPLE: SELECTING MESSAGES CREATES THREAD

Fig. 2

MESSAGE LIST

| CHANNEL | Th. ID | MESSAGE ID | MESSAGES |
|---|---|---|---|
| CH-1 | Th1 | 1 | about programming ... |
|  | Th2 | 2 | the recent meeting ... |
|  | Th2 | 3 | yes |
|  | Th2 | 4 | meeting |
|  | Th1 | 5 | what in programming ... |
|  | Th1 | 6 | what was that ? |

Fig. 3

ADMINISTRATION TABLE

| Th. ID | TITLE | AUTHOR | MEMBER USERS | MESSAGE ID | LINK SOURCE | FORWARDING DEST. | DISCLOSURE LEVEL | STATUS |
|---|---|---|---|---|---|---|---|---|
| 1 | PROGRAM | Jun-Jun | Jun-Jun, ohtsuka, jormiya | | | | PRIVATE | DISPLAY |
| 2 | MEETING | oku | | 2,3,4 | | | PUBLIC | DON'T DISPLAY |

Fig. 5 SCREEN EXAMPLE: SELECTING USER CREATES THREAD

Fig. 6  EXAMPLE OF A CONFIRMATION WINDOW

EXAMPLE OF A THREAD WINDOW

SCREEN EXAMPLE: SELECTING MESSAGES CREATES THREAD

EXAMPLE OF CREATED THREAD

EXAMPLE OF LINK-SOURCE THREAD SELECTION WINDOW

Fig. 11A

ADMINISTRATION TABLE FOR USER Jun-Jun (POST-LINK)

| Th. ID | TITLE | AUTHOR | USERS | MESSAGE ID | LINK SOURCE | FORWARDING DEST. | DISCLOSURE LEVEL | STATUS |
|---|---|---|---|---|---|---|---|---|
| 1 | PROGRAM | Jun-Jun | Jun-Jun, ohtsuka, jormiya | | None | 3 | PRIVATE | DISPLAY |
| 2 | MEETING | oku | | 2,3,4... | None | 3 | PUBLIC | DON'T DISPLAY |
| 3 | New-1 | Jun-Jun | | | 1, 2 | None | | DISPLAY |

Fig. 11B

ADMINISTRATION TABLE FOR USER Ohtsuka (POST-LINK)

| Th. ID | TITLE | AUTHOR | USERS | MESSAGE ID | LINK SOURCE | FORWARDING DEST. | DISCLOSURE LEVEL | STATUS |
|---|---|---|---|---|---|---|---|---|
| 1 | PROGRAM | Jun-Jun | Jun-Jun, ohtsuka, jormiya | 2,3,4... | None | None | PRIVATE | DISPLAY |
| 2 | MEETING | oku | | | None | None | PUBLIC | DISPLAY |
| 3 | New-1 | Jun-Jun | | | None | 1, 2 | | |
| ..... | ..... | | | | | | | |

EXAMPLE OF THREAD-DISPLAYING SELECTION WINDOW

DISPLAY CONTROL METHOD AND DEVICE

BACKGROUND OF THE INVENTION

1. Technical Field

The present invention relates to technology for promoting user convenience in a system in which users share identical networks mutually, enabling simultaneous conversation. More particularly, it relates to technology that makes conversational display easy to view, in a textual conversation system such as IRC (Internet Relay Chat).

In the present invention, "IRC" means a chat system formed by connecting a chat server with a plurality of chat clients on the Internet, and the plurality of chat clients sharing the same virtual space, enabling simultaneous conversation.

Furthermore, "channel" means a virtual space that chat clients share in IRC. A "nickname" utilized in IRC means identifying information for specifying a user. A "topic" means the subject of a channel used in IRC. "Mode" means information that indicates characteristics of a channel utilized in IRC.

2. Description of Related Art

Text conversation systems (simply "chat systems" below) for conducting conversation using text among information terminals on a network have heretofore been offered. For example, Web chat systems that keep a log of messages that WWW (World Wide Web) servers issue have been offered. In Web chat systems users carry out conversations via text by sharing a Web Page log (message record).

A system for conducting conversation by manipulating user alter egos known as "avatars" within a virtual world has also been offered. Still further, IRC in which chat servers signal-distribute conversation to a plurality of chat clients in conformity with IRC protocols have also been offered. These chat systems, conventionally, have been used as systems directed to the general user. Nevertheless, the actual situation recently is that use in business has been increasing, such as for in-house communications and brief meetings.

A plurality of users—in general three persons or more—often join in on chat systems. When the number of participants increases, it can happen that a number of different topics will be going on at once within the same display area. In real-world conversations, the speaker's gaze can distinguish topics, as can approaching the person speaking. In conversations on the Internet, however, wherein the condition of the other party cannot be seen, conversations relating to a plurality of topics end up being intermingled and displayed within the same area.

In chat systems on the WWW, modifying the colors of displayed messages facilitates distinguishing topics. Because changing colors of the messages for every topic is a bother for the user, however, at present this method is seldom used.

Further, in IRC creating channels that differ according to topic is easy. In reality, however, multiple topics often break out within a single channel.

SUMMARY OF THE INVENTION

The object of the present invention is to display topics respectively segregated from other topics wherein a plurality of topics are under way simultaneously on a network, to promote accurate and efficient communication.

In order to address the aforementioned problems, in one aspect the present invention is a display control method utilized in a chat system in which users on information terminals share identical networks mutually, enabling text conversation, the display control method:

(A) correlating messages on the network based on user instructions and creating message groups and predetermined message group information relating to the message groups;

(B) sharing the created message group information with users on the network;

(C) sending messages to the message groups out to the network; and (D) in accordance with user instructions displaying the message groups independently of messages on the network.

Taking an example wherein it is applied to IRC will illustrate the display control method of the present invention. Participants on a channel for example designate particular users, instructing the creation of a message group. Message group information concerned with the created message group is reported to other chat clients in the channel. Message group information may be, for example, nicknames of the users that form the message group, a message group ID, the message group author, and the message group name. Issuing messages to a message group sends that messages out on the channel. The way the message group is displayed conforms to user instructions. The message group can be displayed in the same display area the channel is displayed, or can be displayed independently of the channel display area.

In a further aspect the invention is a display control device utilized in a chat device wherein, sharing an identical network mutually, transmission/reception of text messages is possible, and presents the display control device provided with creating means, reporting means, memory means and input/output control means.

The creating means correlates messages on the network according to user instructions and creates message groups and predetermined message group information relating to the message groups. The reporting means transmits/receives the created message group information to and from other among display control devices on the network. The memory means stores the message group information. The input/output control means obtains the message groups from the chat device and in accordance with user instructions, enables display of the message groups independently of messages on the network.

Likewise as described before, taking an example wherein it is applied to IRC will illustrate the display control device. A user, for example, designates the individual users constituting a message group. The creation means creates the message group out of the messages from the designated member users. The creation means also creates message group IDs, and predetermined message group information containing member users and the creating user, which is stored in the memory means. The created message group information is reported by the reporting means to other display control devices in the channel. The report may be either via a chat client, or directly transmitted/received among the display control devices. Other display control devices accept from the reporting means message group information that the other display control devices have created, which is stored in the memory means.

With input/output control means, in accordance with user instructions, the message group can be displayed in a window separate from the messages within the channel. Of course, it is also possible to display both messages within a channel and message groups together in the same window.

The message groups are obtainable, for example, from a message log that the chat client has created.

The present invention in another aspect presents a display control device wherein the creating means in the second aspect of the invention accepts operations directed to the message groups and updates the message group information.

For example, the creating means accepts message group link instructions and creates message group information in which linked message groups and the message group link source are correlated.

In a further aspect the invention presents a display control device wherein the input/output control means in the second aspect of the invention accepts messages in which the message groups are designated and acquires from the network or sends to the network messages for the message groups.

The input/output control means, for example in a window displaying the message groups, deems inputted messages to be messages to the message group, and sends them out to the channel. The input/output control means also obtains from the channel messages to message groups transmitted from other display control devices. According to user instructions, the obtained messages are displayed in a window for message groups or in an ordinary chat window.

The present invention in yet another aspect presents a display control device wherein the creation means in the second aspect of the invention correlates messages within the network based on selection of the chat device from a user, and creates message groups out of messages from the selected chat devices and message group information containing information that designates the selected chat devices.

When a user chooses individual users within a channel, the creation means creates a message group that will be constituted by messages from the chosen users. Information specifying the users comprising the message group, nicknames, for example, are contained in the message group information. Selecting user names, or selecting user messages can be given as methods of choosing users.

In a still further aspect the invention presents a display control device wherein that of the second aspect of the invention is provided with a message list correlating messages within the network and message identifying information specifying the messages; wherein the creation means creates, based on selection of the messages from a user, message groups containing the selected messages and message group information containing message-identifying information for the selected messages.

Selecting not the users, but specific messages creates the message groups. Message IDs that specify designated messages are contained in the message group information.

The present invention in another aspect presents a display control device wherein the creation means in the second aspect of the invention creates message group information in which a disclosure level of the message groups that are created is contained.

The disclosure level setting may be designated by the individual users, or automatically set in according to the type of message group. For example, wherein the message group is created by designating individual users, the creating means sets the disclosure level to "Private." On the other hand, wherein the message group is created by designating messages, the creating means sets the disclosure level to "Public."

In a further aspect the invention presents a display control device wherein message-group identifying information specifying the message groups is contained in the message group information.

Including a message group ID in the message group information enables sharing message groups mutually within the same channel. Consequently, the created message groups can be displayed in common among the users according to each user's respective preference.

The invention in yet another aspect presents a display control device wherein the input/output control means in the second aspect of the invention judges based on the message group information whether to display the message groups, and displays the message groups based on the judgment.

The input/output control means decides whether or not to display the message group according to, for example, the before-described disclosure level or to the type of message group. Specifically, if the disclosure level is "Public," the decision is "displayable." Conversely, if the display level is "Closed to Public," wherein chat clients constitute the message group, the decision is "not displayable."

In s till a further aspect, the present invention presents a computer-readable recording medium on which is recorded a display control program utilized in a chat device wherein, sharing an identical network mutually, transmission/reception of messages through text is possible, the computer-readable recording medium on which is recorded the display control program for executing steps A–D below.

(A) a step of correlating messages on the network based on instructions from a user and creating message groups and predetermined message group information relating to the message groups;

(B) a step of transmitting/receiving the created message group information among other chat devices within the network;

(C) a step of storing the message group information; and (D) a step of obtaining the message groups from the chat device and in accordance with instructions from users displaying the message groups independently of messages within the network.

Examples of a computer-readable recording medium herein include computer-readable/writeable floppy disks, hard disks, semiconductor memory, CD-ROMs, DVDs (digital video disks), and MOs (magneto-optical disks).

Utilizing the present invention enables the conversation of users chatting by sharing a network such as an electronic meeting room to be displayed to suit each person's liking. Moreover, users can also designate that one another's displays be made in common, enabling them to carry out efficient communication.

The foregoing and other objects, features, aspects and advantages of the present invention will become more apparent from the following detailed description in conjunction with the accompanying drawings.

BRIEF DESCRIPTION OF THE DRAWINGS

FIG. 2 is a conceptual illustration of a message list;

FIG. 3 is a conceptual illustration of an administration table

FIG. 11 is a conceptual illustration of a post-thread-linking administration table:

Figure 12:
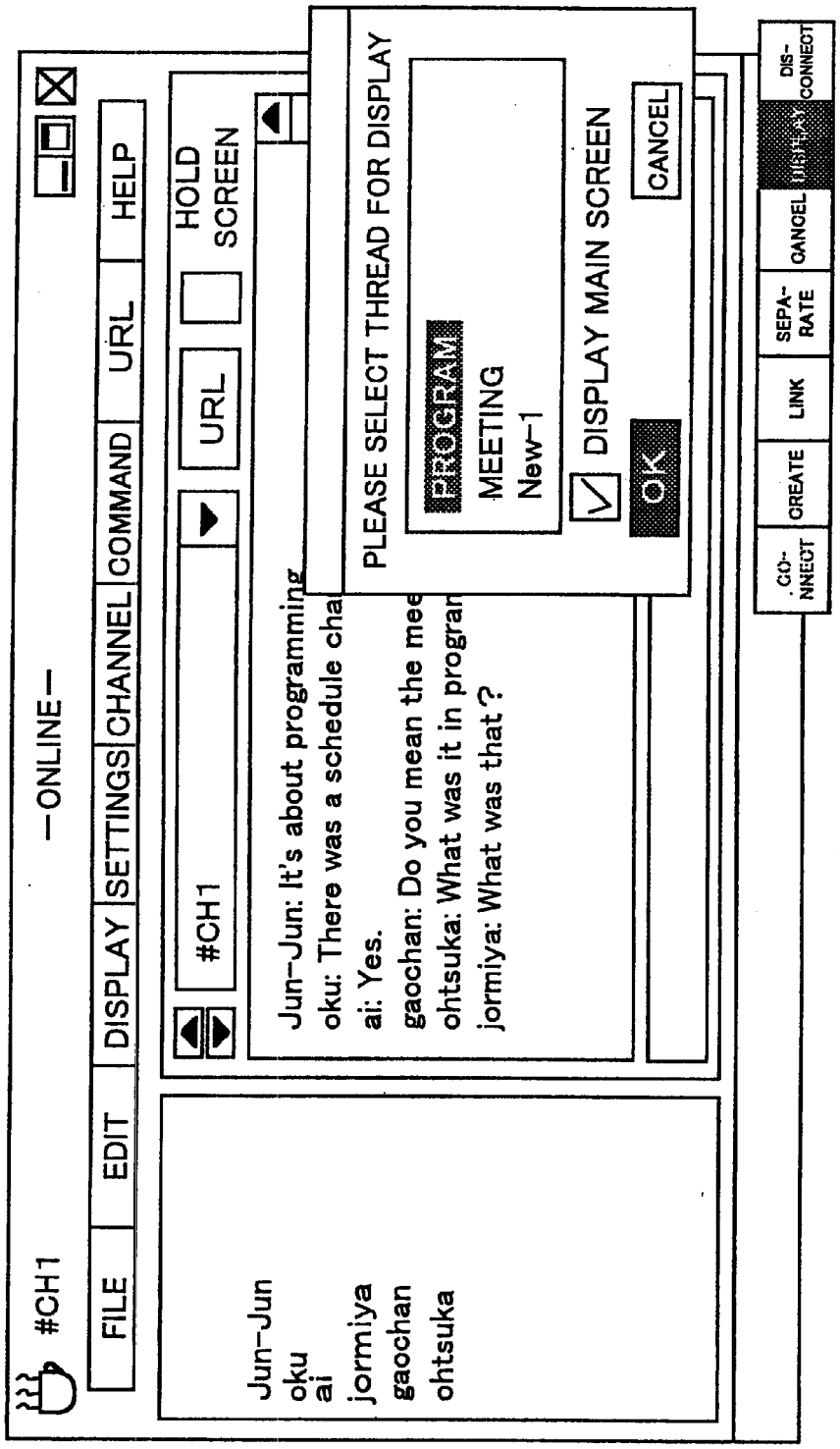
Figure 13:
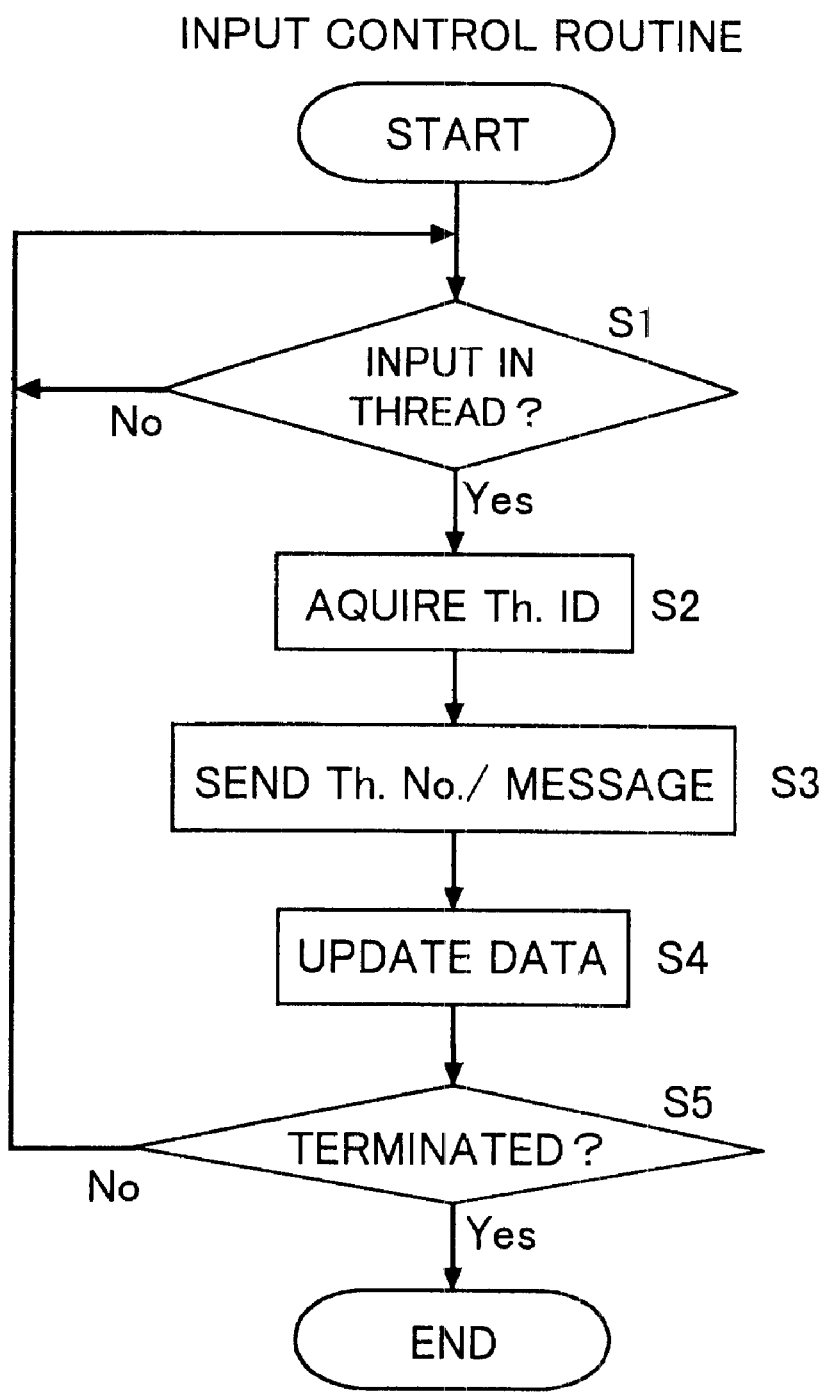
Figure 14:
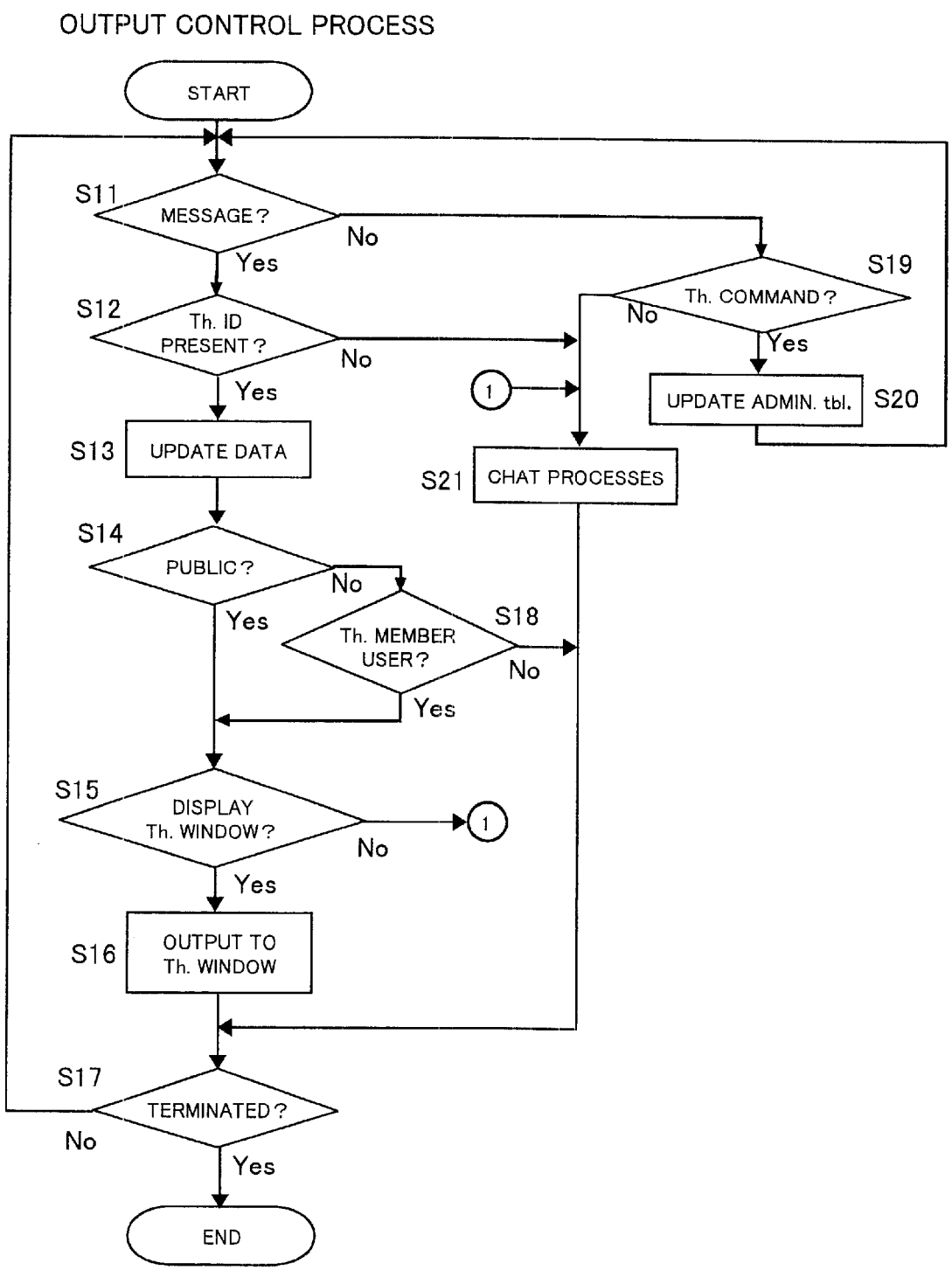
Figure 15:
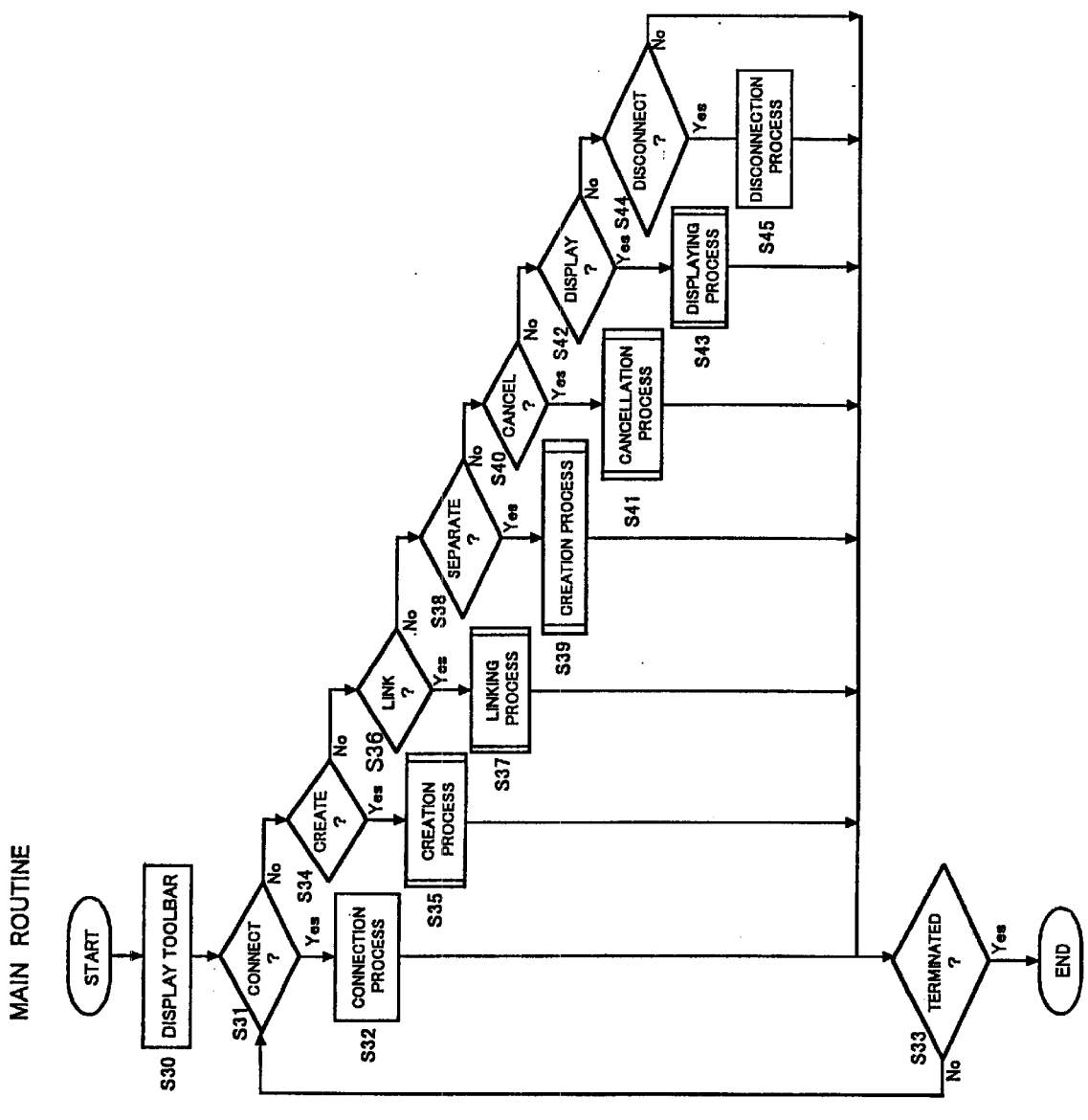
Figure 16:
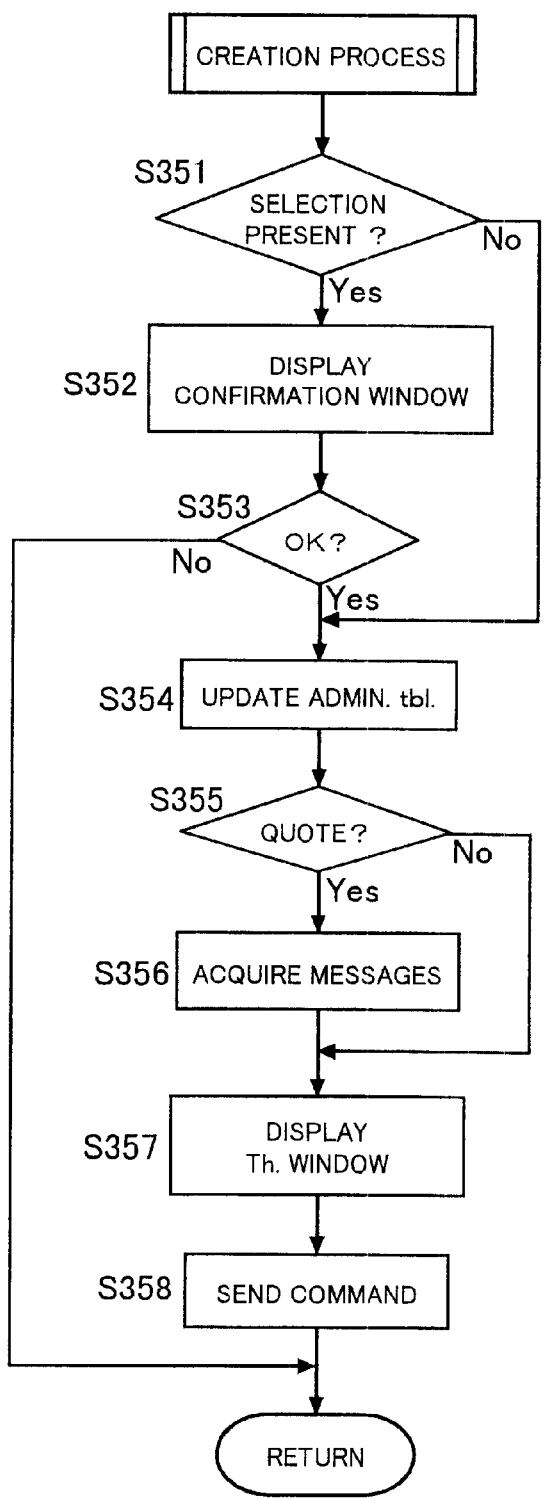
Figure 17:
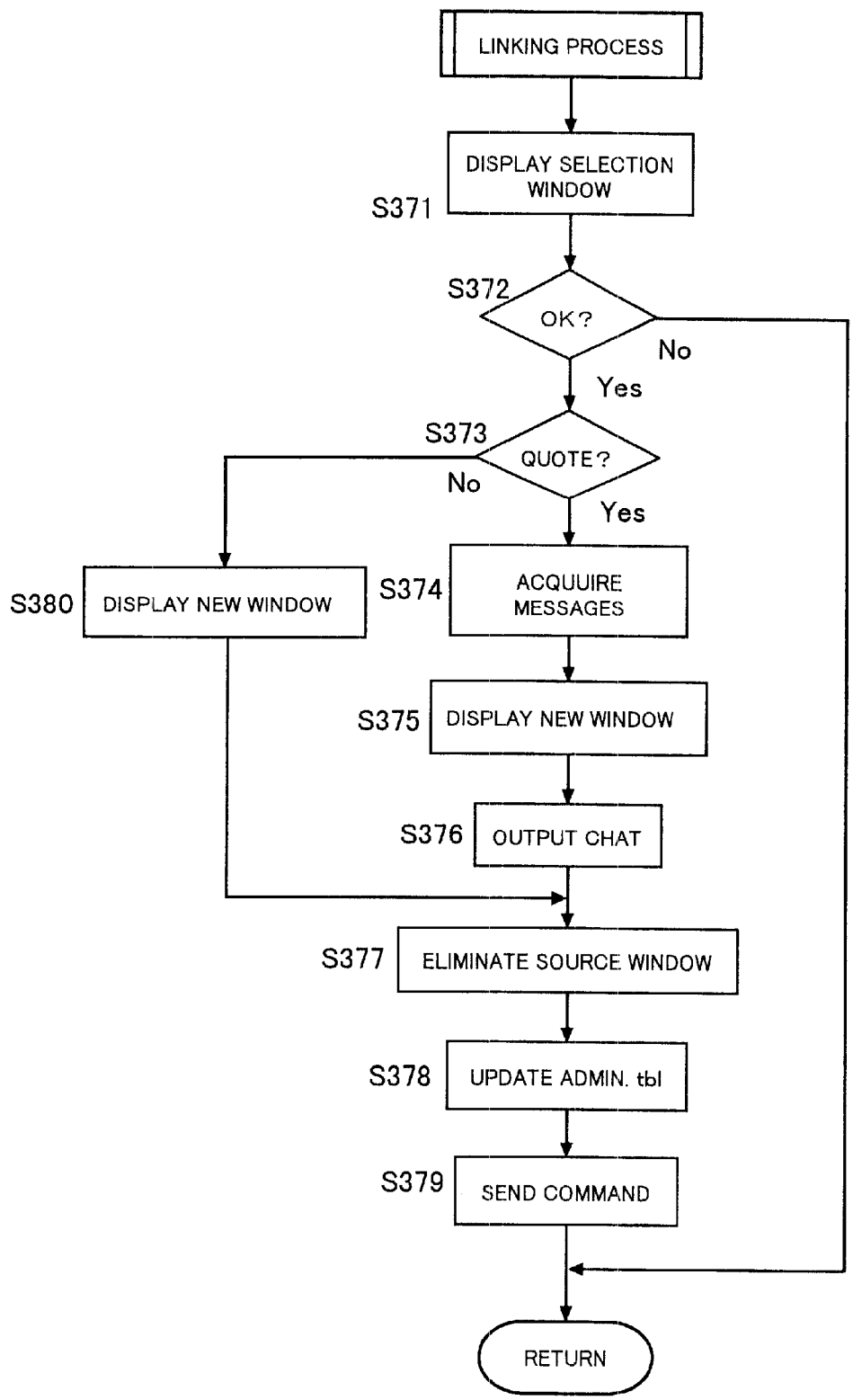
Figure 18:
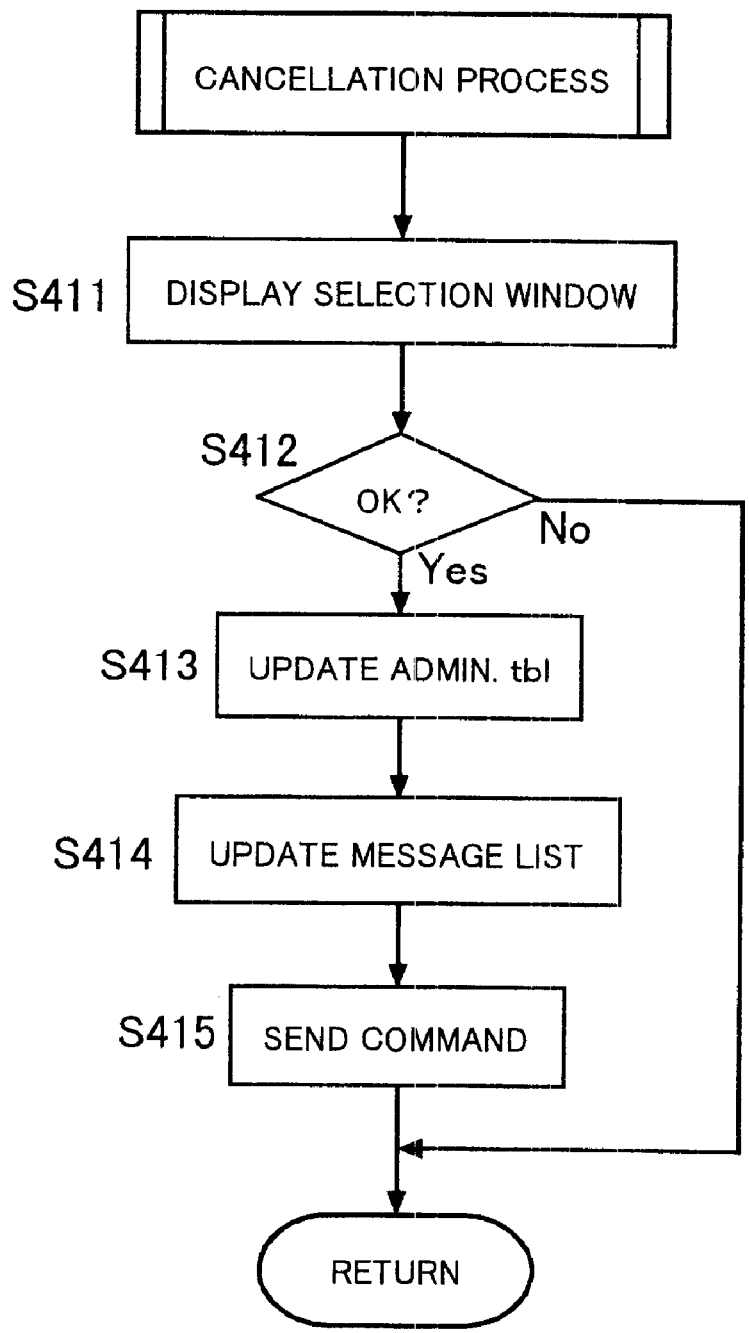

(a) Linker's administration table, and (b) Administration table for a user apart from the linker;

FIG. 12 is a diagram showing an example of a selection window wherein "Display" is selected;

FIG. 13 is a flowchart depicting flow in an input control process that the display control device carries out;

FIG. 14 is a flowchart depicting flow in an output control process that the display control device carries out;

FIG. 15 is a flowchart depicting flow in main routine that the display control device carries out;

FIG. 16 is a flowchart depicting flow in a creation process subroutine;

FIG. 17 is a flowchart depicting flow in a linking process subroutine;

FIG. 18 is a flowchart depicting flow in a cancellation process subroutine; and

Figure 19:
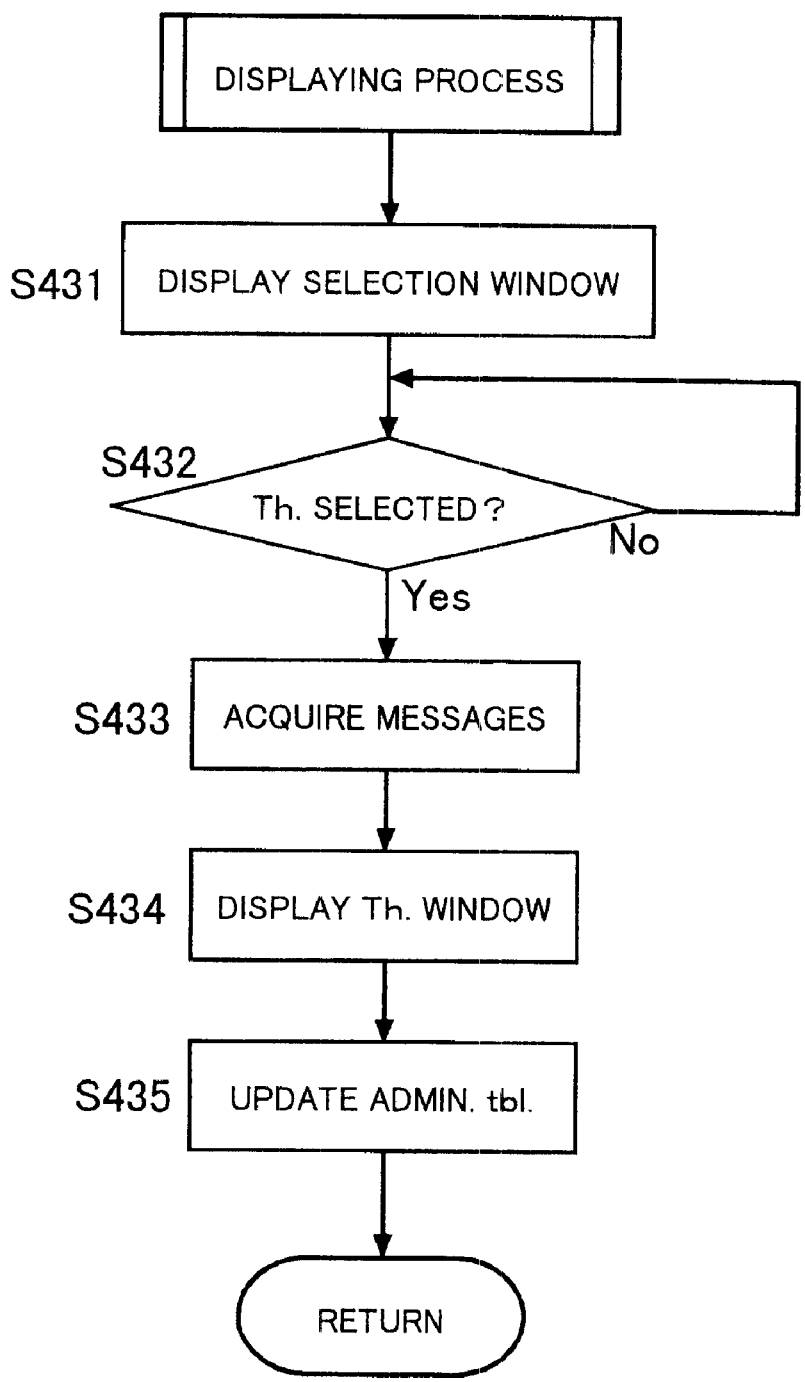

FIG. 19 is a flowchart depicting flow in a display process subroutine.

DETAILED DESCRIPTION OF THE PREFERRED EMBODIMENTS

Next, a display control device of the present invention will be definitely explained with reference to the drawings.

First Embodiment

Configuration

Figure 1:
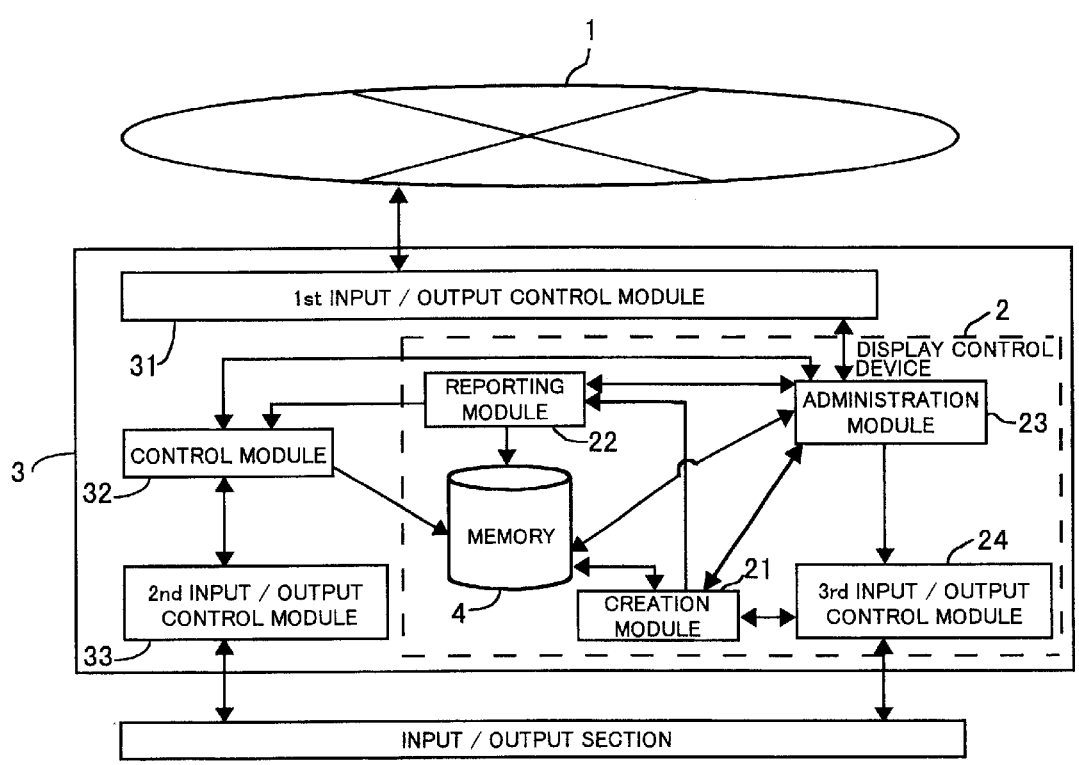
FIG. 1 is a functional block diagram showing the configuration of a display control device pertaining to the present invention in a first embodiment.

FIG. 1 is a function block diagram illustrating the configuration of a display control device in connection with the first embodiment of the present invention. For ease of description, the explanation takes an example in the present embodiment wherein the display control device is adapted to an IRC chat client.

(1) Chat Client

The chat client 3 in FIG. 1 can converse with other chat clients via the Internet 1. The chat client 3 has a display control device 2, a first input/output control module 31, a control module 32, a second input/output control module 33, and a memory 4. To begin with, a brief explanation will be made of the configuration of the chat client 3 apart from the display control device 2.

The first input/output control module 31 carries out data transmission/reception between it and the Internet 1.

The memory 4 stores predetermined information relating to the channels in which the chat client 3 participates. "Predetermined information" is, for example, channel name, nicknames of users in the channel, topics, and channel attributes. A log of messages in the channel is also stored in the memory 4.

The control module 32 ordinarily transmits/receives data between it and the Internet 1 via the first input/output control module 31. In the present embodiment, however, the control module 32 carries out data transmission/reception via the display control device 2. The predetermined information among the data received is stored in the memory 4. Also, messages received from other chat clients are sent to the second input/output control module 33 and displayed.

Further, the control module 32 accepts input messages from the second input/output control module 33 and sends them out on the channel via the display control device 2.

The second input/output control module 33 accepts received messages from the control module 32 and outputs them on an input/output section display. The second input/output control module 33 also sends inputted messages from the input/output section to the control module 32.

(2) Display Control Device

The display control device 2 has a creation module 21, a reporting module 22, a third input/output control module 23, and an administration module 24 as well as the memory 4. The display control device 2 shares the memory 4 with the chat client 3.

The memory 4 holds a message list and an administration table, which it adds to predetermined information relating to the channels. A diagram conceptually illustrating a created message list in the memory 4 is shown in FIG. 2. Message lists are created for each channel. Thread IDS (in the figures, noted as "Th.ID") that specify message groups (called "threads" hereinafter), message IDs that specify messages, and messages are correlated and stored in the message list. It is preferable that the message list be created by appending the message IDs and the thread IDs to the message log that the chat client control module 32 creates.

The message IDs are identifying information attached in order to specify the messages, and are, for example, consecutive numbers. The thread IDs are identifying information for specifying threads. The FIG. 2 message list is a message list for the channel "CH1". . . The messages in which the message IDs are "1," "5" and "6" are included in the thread that is specified with thread ID "Th1." The other messages are included in the thread that is specified with thread ID "Th2."

A diagram conceptually illustrating an administration table created in the memory 4 is shown in FIG. 3. For ease of description, the message list is as is in FIG. 2. Predetermined information (called "thread information" hereinafter) relating to each of the threads is described in the administration table. Thread information in the present instance consists of thread IDs, titles, authors, member users, message IDS, link sources, forwarding destination, disclosure level and status.

"Titles" are preferably text information for displaying the threads to the users. Preferably, the users can set the titles arbitrarily. "Author" is the nickname of the user who created the thread. "Member users" are the users who construct the thread. This, as will be discussed later, is information that is described wherein the threads are created by selecting the users. In the present embodiment, the threads are created by the users or by selecting any message.

"Link source" as will be discussed later is a linked thread ID wherein a plurality of threads is linked. It is information that is described in the administration table of the user linked to the thread. "Forwarding destination" is information for expressing link sources of threads linked by other users.

"Disclosure Level," if "Public," indicates that messages within the thread are approved to be open to all of the users. If "Private," it indicates that messages within the thread are approved to be open only to users in the thread. The thread author would best make the disclosure level setting. It is also possible that with the disclosure level of a thread formed by users being "Private," the disclosure level of the other threads be set to "Private." In the present embodiment, the disclosure level of threads created by selecting users is automatically made "Private." "Status" indicates whether or not a window exclusively for threads (called "thread window" hereinafter) is currently being displayed.

The creation module 21 receives from the administration module 23 instructions for a process on threads. Following the instructed process, the creation module 21 updates the administration table. As concrete examples of the process on threads, creation, segregation, linking and display can be given. For example, when thread creation is instructed, the creation module 21 creates thread information and records it in the administration table. The creation module 21 also reports updated thread information to the reporting module 22.

The reporting module 22 transmits/receives thread information via the administration module 23. Specifically, the reporting module 22 receives thread information from other display control devices and updates the administration table and the message list. The reporting module 22 also sends thread information reported from the creation module 21 out to the other display control devices within the channel. Establishing predetermined thread commands is preferable for transmitting/receiving the thread information. For instance, an example of a thread command to create "Th1" is shown below. Th_create;ThID=Th1;Creator=Jun-Jun;User=Jun-Jun,ohtsuka,jormiya;Private Thread commands for reporting thread-linking, separating, and deleting are established likewise.

The administration module 23 transmits/receives messages via the first input/output control module 31 and updates the message list and the administration table. The administration module 23 judges whether or not received messages are messages in the threads. This decision is executed, for example, according to whether a thread ID is present in the message. Wherein the administration module 23 has judged a message to be in the threads, it sends the message out to the control module 32 and the third input/output module 24 in accordance with user instructions.

The administration module 23 also receives messages in the thread window from the third input/output module 24. The administration module 23 sends the received messages and thread IDs out to the channel.

Furthermore, the administration module 23 receives from the third input/output module 24 selection of processes on threads, and directs the processes to the creation module 21. Wherein it has received selected users and messages from the third input/output module 24, it also reports this information to the third input/output module 24. For example, the administration module 22 executes a process in accordance with the selection by directing output of the toolbar 305 shown in FIG. 4 to the third input/output module 24.

In accordance with instructions from the administration module 23 and the creation module 21, the third input/output module 24 displays the toolbar 305 and the various windows. The third input/output module 24 accepts process selections in the toolbar 305 and message input through the thread window, which it reports to the administration module 23. The third input/output module 24 accepts and reports to the creation module 21 users, message selections, and thread selections. The third input/output module 24 also receives messages themselves and thread IDs from the administration module 23, and displays the messages in a designated thread window.

Screen

The following will illustrate examples of screens displayed by a display control device of the present invention. For ease of description, the message list is as is shown FIG. 2.

Figure 4:
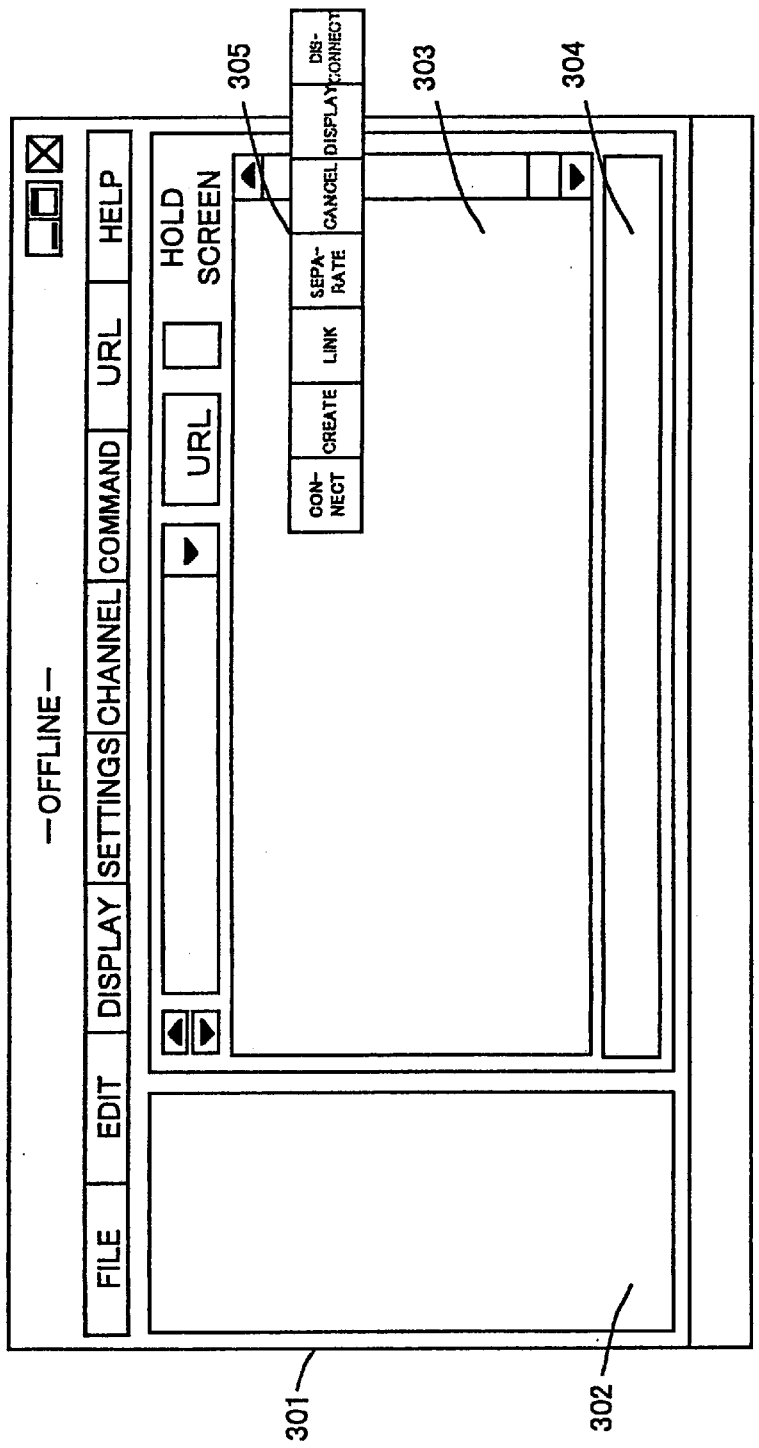
FIG. 4 is a screen example showing a chat client pertaining to the present embodiment, in its state just after activation.

FIG. 4 depicts a screen just after booting a chat client relating to the present embodiment. A main screen 301, a user window 302, and chat window 303, and message input field 304 are displayed in the FIG. 4 screen. These windows are likewise as with general IRC clients; therefore explanation is omitted.

In addition to the aforementioned general IRC screen, toolbar 305 is depicted in FIG. 4. The chat client is not connected to the network, and therefore only "Connect" is available on the toolbar 305. When "Connect" is clicked, the chat client is connected via the Internet 1 to a chat server. It is otherwise connected directly to other chat devices or to a WEB server, however, wherein the display control device 2 is applied to other chat devices apart from IRC chat clients.

Figure 5:
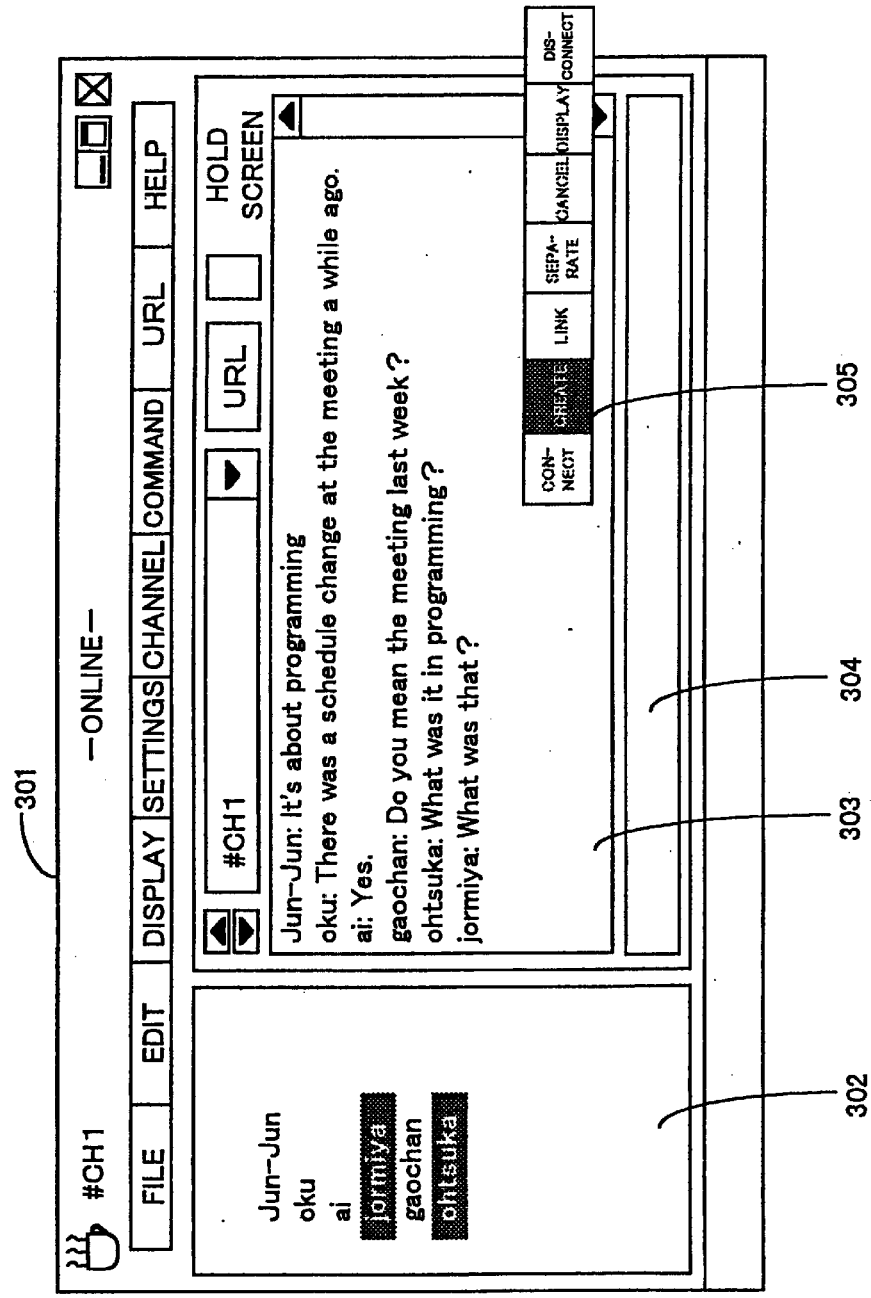
FIG. 5 is a screen example following connection to a chat server.
Figure 6:
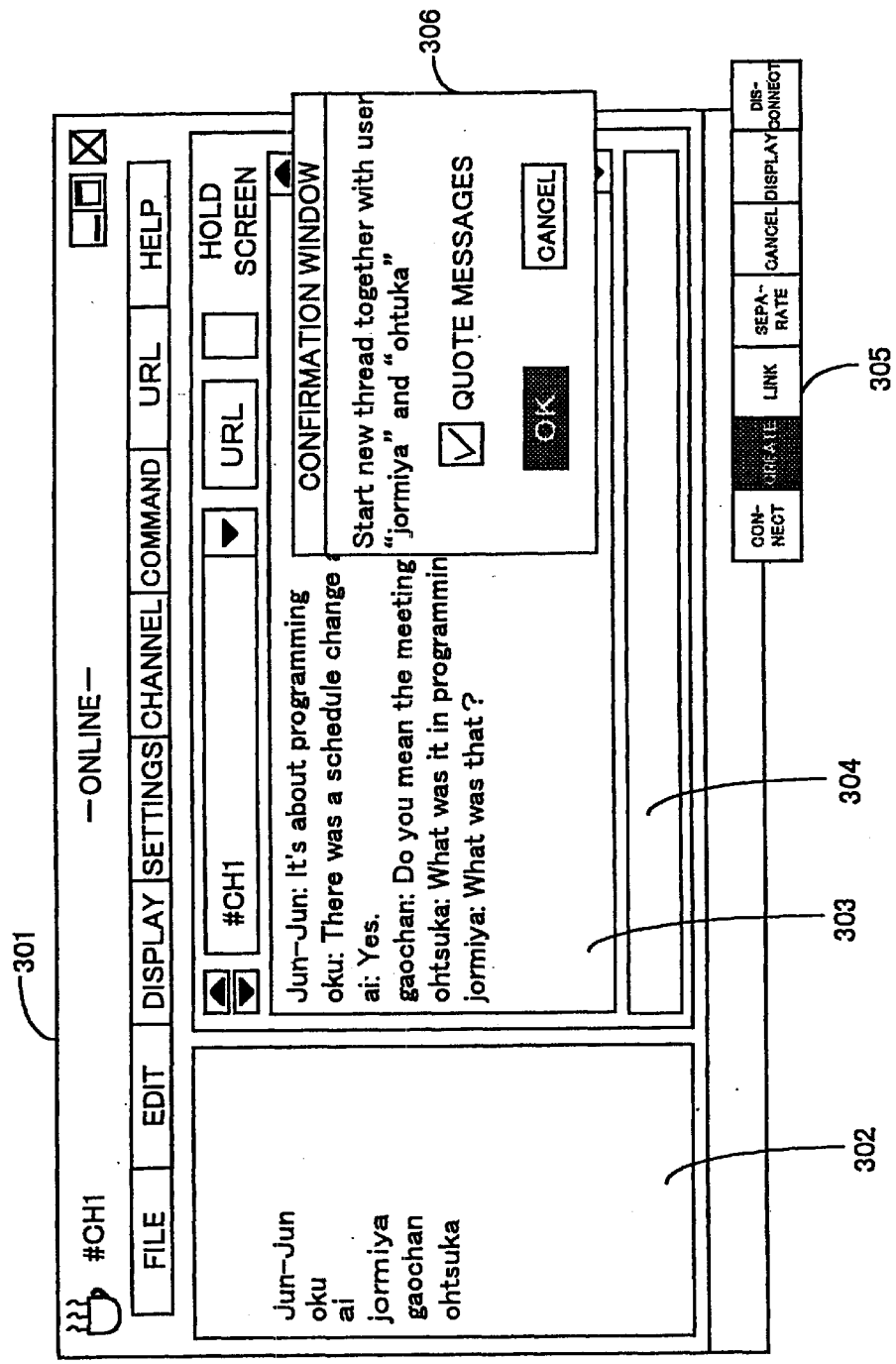
FIG. 6 is a diagram showing an example of a confirmation window.

FIG. 5 depicts a screen after connection to a chat server. In this state "connect" on the toolbar 305 is not available. On the other hand, "Create" and "Disconnect" are available. Selecting respective users in the user window 302 and clicking "Create" displays a confirmation window as shown in FIG. 6. In FIG. 6, users "jormiya" and user "ohtsuka" are selected. In this case, user "Jun-Jun" would be the author of the thread.

The window shown in FIG. 6 is for confirming whether or not to display past messages in the freshly created thread window. Predetermined messages and a "Quote messages" checkbox are displayed in the confirmation window when the "Quote messages" checkbox is checked and the "OK" button is pressed, a thread window is displayed. The messages displayed in the confirmation window will differ, however, depending on whether member users have been selected, whether messages have been selected, or whether neither has been selected.

Figure 7:
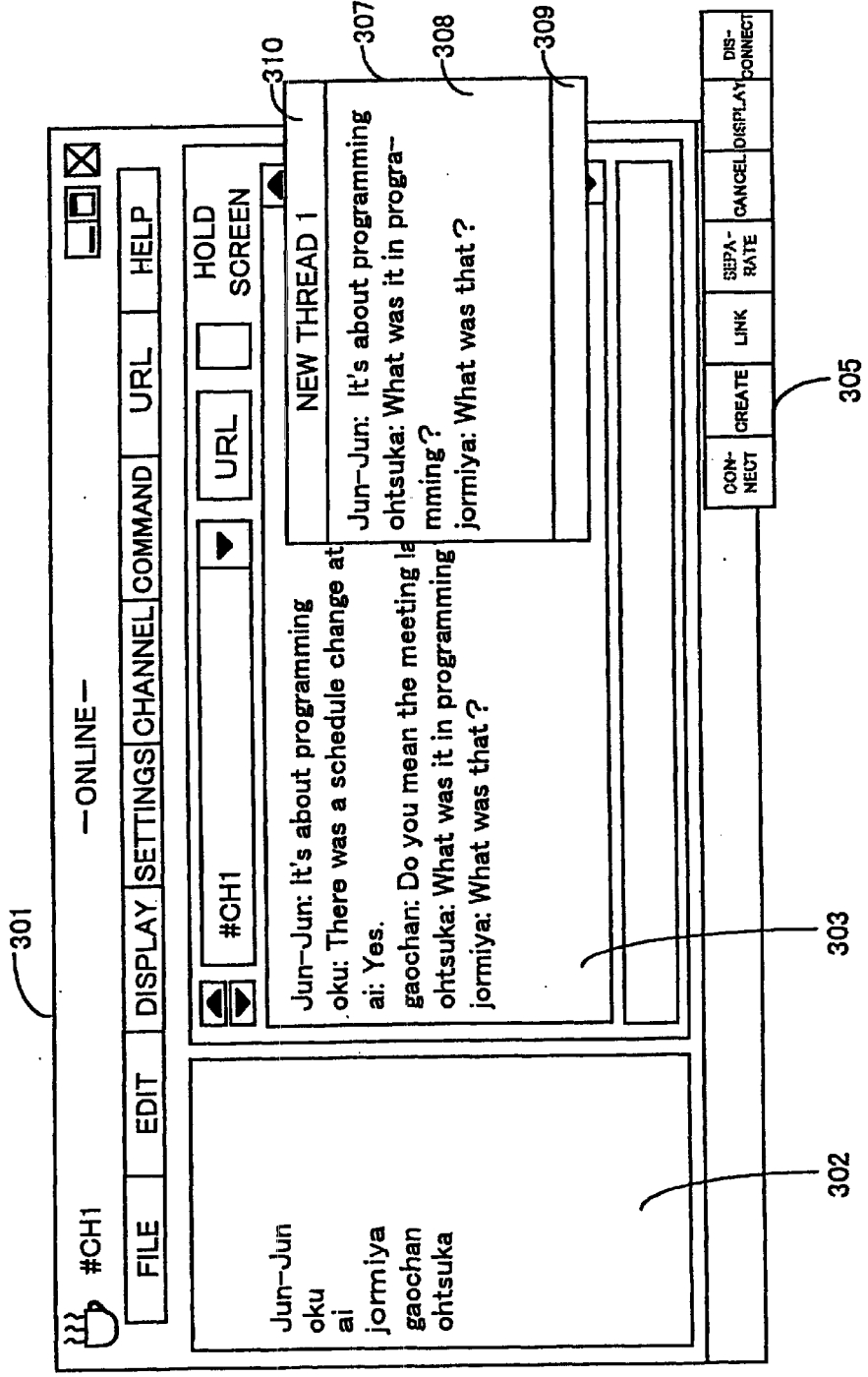
FIG. 7 is a diagram showing an example of a thread window.

An example of a thread window 307 when a new thread has been created is depicted in FIG. 7. Thread window 307 includes message window 308, input field 309, and title field 310. User messages composing the thread are displayed in the message window 308. Messages for the thread can be input in the input field 310. The default thread name "New Thread 1" is displayed in the title field 310. Users can change the thread name as they wish.

In the FIG. 7 state, "Create," "Cancel," and "Disconnect" are available on the toolbar 305. Wherein a selecting users creates the thread, thread-composing-users are described in the thread information, as shown in the administration table in aforementioned FIG. 3.

Figure 8:
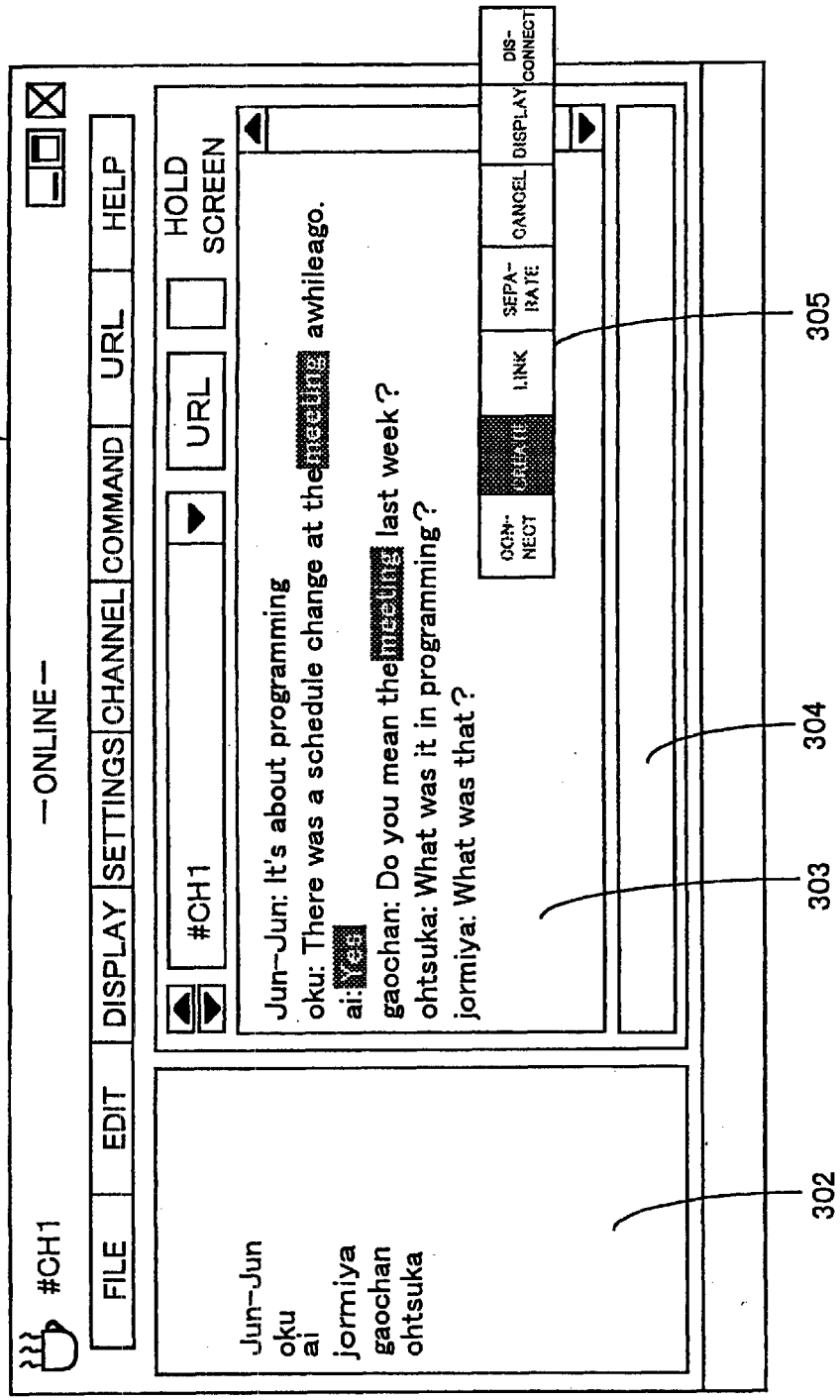
FIG. 8 is a screen example wherein selecting messages creates a thread.

An example screen wherein a thread is created not by selecting users, but by selecting messages, is shown in FIG. 8. FIG. 8 depicts the situation in which a thread is created by selecting messages as a whole, or words included in messages. Wherein the thread is created by selecting messages, message IDs are described in the thread information, as shown in aforementioned FIG. 3 administration table. Herein, it is preferable that selecting messages means selecting users.

Figure 9:
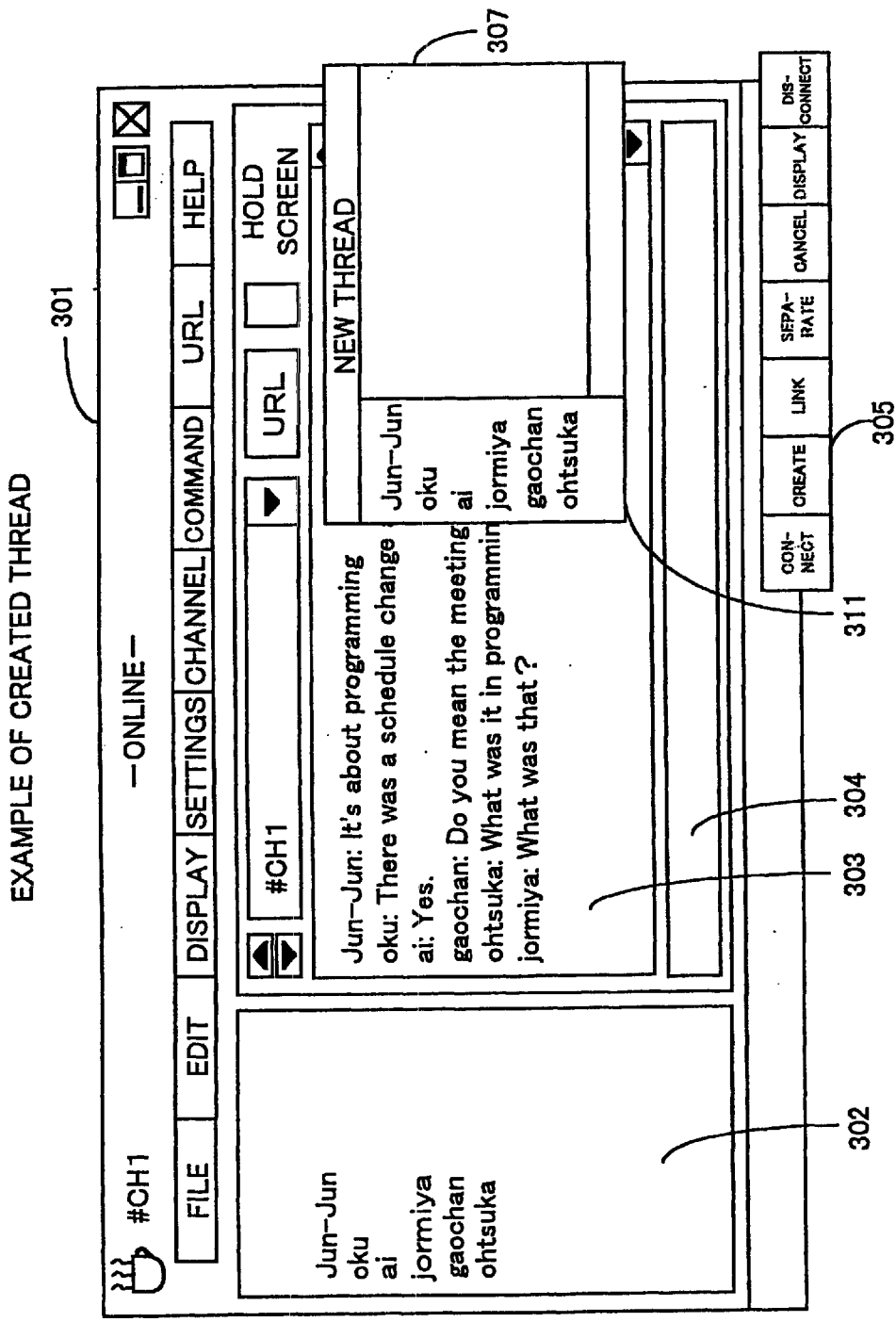
FIG. 9 is a diagram showing an example of a new thread window wherein users and messages are not selected.

It is possible, furthermore, to create threads without selecting users or messages. For example, wherein "Create" is pressed without making any selection, as shown in FIG. 9 a new thread window 307 is simply displayed with no message. Displaying a list of users in the channel by displaying a user list 311, shown in FIG. 9 in the new thread window, is desirable.

Figure 10:
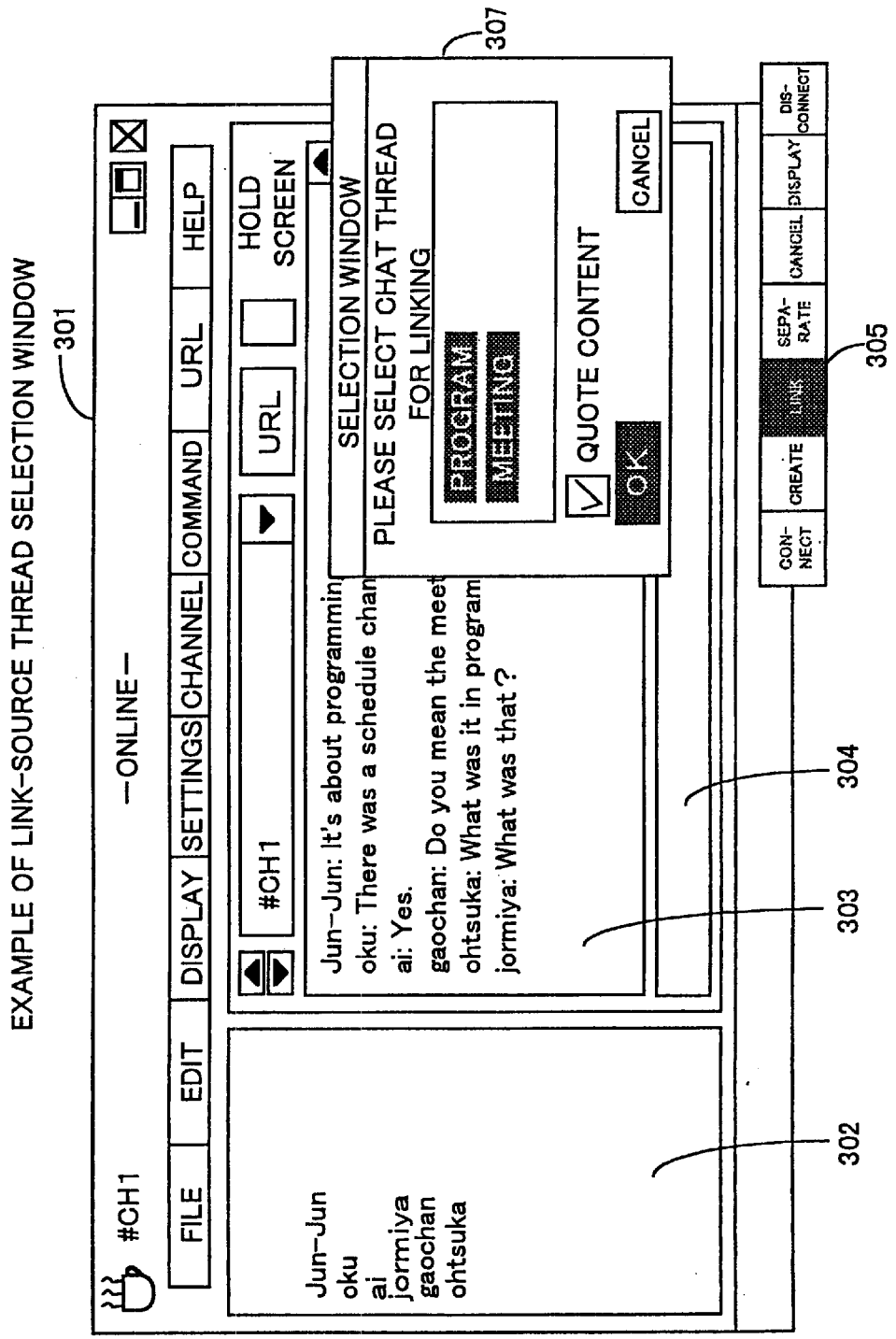
FIG. 10 is a diagram showing an example of a selection window wherein "Link" is selected.

FIG. 10 illustrates a selection window displaying the situation wherein "Link" has been selected on the toolbar. A list of threads created in the channel is displayed in the selection window. When two or more threads are selected and the "OK" button is pressed, the selected threads (link source threads) are displayed in a linked-threads (forwarding destination threads) window. Wherein the "Quote Content" checkbox has been checked, past messages from the link source threads are displayed in thread window for forwarding destination threads. The message display order can be, for example, displaying in a time sequence, displaying in a user-and-time sequence, or otherwise designed to meet needs.

FIG. 11 depicts an administration table wherein thread "Th3" has been created by user "Jun-Jun" linking thread "Th1" and "Th2." FIG. 11(a) illustrates an administration table for user "Jun-Jun." FIG. 11(b) illustrates an administration table for a user apart from user "Jun-Jun." In FIG. 11(a), thread IDs that have become link source threads are described as link sources in the thread information for linked thread "Th3." In FIG. 11(b), thread IDs that have become link source threads are described as forwarding destinations in the thread information for linked thread "Th3." Accordingly, for user "Jun-Jun," with whom there are linked users, a thread window is displayed in which messages in threads "Th1" and "Th2" are mixed. Nevertheless, this does not effect the displays for other users. If for example user "Jun-Jun" issues a remark in thread "Th3," other display control devices receiving the message consult their administration tables and display the message in one forwarding destination thread or another.

FIG. 12 illustrates an example of a selection window displaying the situation wherein "Display" has been clicked on the toolbar. A list of created thread titles is displayed in the selection window. When any of the threads is selected and the "OK" button is pressed, the selected thread window is displayed. Further, when the "Display Main Screen" checkbox has been checked the thread window is displayed on the main screen. In the FIG. 12 example, the title "Program" has been selected.

Process Flow

The following explains, by giving concrete examples, the flow of processes that the display control device 2 executes. The display control device 2 independently performs the input control routine, output control routine and main routine below.

(1) Input Control Routine

FIG. 13 is a flowchart illustrating flow of an input control routine that the display control device 2 executes. Activating the chat client starts the following processes.

Initially, in step S1 the third input/output control module 24 stands by for message input into the thread window. When a message is input into the thread window, step S2 ensues.

In step S2 the third input/output control module 24 acquires the ID of the thread in the acquired message. Herein, the thread window being displayed and the thread ID are correlated and held in the third input/output control module 24.

In step S3, the third input/output control module 24 sends the input message content and the thread ID for the message to the administration module 23.

In step S4 the administration module 23 updates the message list and the administration table. Specifically, the administration module 23 writes the message, the thread ID, and the message ID into the message list. The administration module 23 also consults the entries in the administration table and writes the message IDs into the administration table as needed.

In step S5, the administration module 23 judges whether or not the chat client has terminated, and if it has not terminated, returns to step S1 again and stands by for succeeding input. If it has terminated, the routine ends.

(2) Output Control Routine

FIG. 14 is a flowchart depicting flow of an output control routine that the display control device 2 executes. Like the aforementioned input control routine, activating the chat client starts the following routine.

Initially, in step S11, the administration module 23 judges whether or not received data is a message from another chat client. If it is a message, step S12 ensues. If it is other data, later-described step S19 ensues.

In step S12, the administration module 23 judges whether or not the message is in a thread. This decision judges based on whether or not, for example, a thread ID is included in a predetermined position in the message. If the message is in a thread, step S13 ensues. If not, later-described step S21 ensues.

In step S13, the administration module 23 updates the message list and, if necessary, the administration table. Received messages, message IDs, and thread IDs are written in the message list. Wherein threads for message objects (object threads hereinafter) have not been composed from designated users, the administration module 23 writes the message ID into the administration table.

In step S14, the administration module 23 consults the administration table and judges whether the disclosure level of the object thread is "Public" or not. If it is "public," step S15 ensues. Otherwise, later-described step S18 ensues.

In step S15, the administration module 23, consulting the administration table, judges whether or not the window for the object thread is being displayed. Wherein the thread window is being displayed, step S16 ensues. Wherein the thread window is not being displayed, the administration module 23 sends the message to the control module 32, and later-described step S21 ensues.

In step S16, the object thread is publicly open to all users, and therefore the administration module 23 outputs the received message to the thread window.

In step S17, the administration module 23 judges whether or not the chat client is terminated or not, and if it is not terminated, returning to aforementioned step S11 the foregoing routine is repeated. If it is terminated, the routine ends.

In aforementioned step S14, when the object thread is judged to be "Private," step S18 ensues. In step S18, the administration module 23 judges whether or not the user is a member user in the object thread. If "Yes," aforementioned step S15 ensues; if "No," aforementioned step S17 ensues. That is, the received message is not displayed in either the thread window or in the chat window on the main screen.

In aforementioned step S11, when the received data is judged not to be a message, step S19 ensues. In step S19, the reporting module 22 judges whether or not the received data is a thread command. If the decision is "Yes," step S20 ensues. If the decision is "No," the reporting module 22 sends the received data to the control module 32, and later-described step S21 ensues. That is, when the reporting module receives a thread command such as thread creation reports or link reports, step S20 ensues. If, however, change in topic or mode reports from the server, change in participating user reports are received, for example, later-described step S21 ensues. In step S20, the administration module 23 updates the administration table. There will be instances in which the update process will differ according to the received thread command.

In the foregoing step S12, if the message is judged not to be a thread, step S21 ensues. Herein, in step S21, the administration module 23 sends the message to the control module 32. The message, likewise as in ordinary chat clients, is output to the main screen.

Further, wherein in aforementioned step S15 the decision is that the window for the object thread is not being displayed, step S21 ensues. Herein, in step S21, the administration module 23 sends the thread message to the control module 32. The thread message not being displayed in the thread window is therefore displayed in the main screen.

Further, wherein in aforementioned step S19 the decision is that the received data is neither a message nor a thread command, step 21 ensues. There are instances in which the joining/departing of channel participating users, change in topic, altering channel mode, or altering channel operator characteristics, for example, are received. Herein, the received data is sent from the reporting module 22 to the control module 32. The control module 32, likewise as in ordinary IRC routines, stores the received data into the memory 4.

Main Routine Flow

The following explains the flow of the main routine executed by the display control device 2. FIG. 15 is a flowchart illustrating flow of the main routine executed by the display control device 2. Like the aforementioned input control routine and output control routine, activating the chat client starts the following processes.

In step S30, the creation module 21 instructs the third input/output control module 24 to display the toolbar 305. This instruction displays the toolbar 305 in the input/output section.

In step S31, the third input/output control module 24 stands by for any process to be selected, and reports a selected process to the administration module 23. The administration module 23 judges whether or not "Connect" has been selected. If the decision is "Yes," step S32 ensues. Otherwise, later-described step S34 ensues.

In step S32, the administration module 23 performs a connection process. In the present example, the administration module 23 carries out the process of connecting to a chat server. However, wherein a display control device of the present invention is applied to Web chat, for example, the connection process is carried out with a Web server providing Web chat services.

In step S33, the administration module 23 judges whether the chat client has terminated, and if it has not terminated, returns to step S31 and repeats the foregoing processes. If it has terminated, the routine ends.

In the decision in aforementioned step S31 is "No," step S34 ensues. In step S34, the administration module 23 judges whether or not "Create" has been selected. If "Yes" is the case then step S35 ensues. If "No" is the case then later-described step S36 ensues.

In step S35, the creation module 21 executes a later-described creation process subroutine.

In step S36, the administration module 23 judges whether or not "Link" has been selected, and if "Yes," step S37 ensues. If "No," later-described step S38 ensues.

In step S37, the creation module 21 executes a later-described linking process subroutine.

In step S38, the administration module 23 judges whether or not "Separate" has been selected, and if "Yes," step S39 ensues. If "No," later-described step S40 ensues.

In step S39, the creation module 21 executes the later-described creation process subroutine.

In step S40, the administration module 23 judges whether or not "Cancel" has been selected. If "Yes," step S41 ensues. If "No," later-described step S42 ensues.

In step S41, the creation module 21 executes a later-described cancellation process subroutine.

In step S42, the administration module 23 judges whether or not "Display" has been selected. If "Yes," step S43 ensues. If "No," later-described step S44 ensues.

In step S43, the administration module 23 executes a later-described displaying process subroutine.

In step S44, the administration module 23 judges whether or not "Disconnect" has been selected; if "Yes," step S45 ensues, and if "No," returns to aforementioned step S33 and repeats the foregoing processes.

In step S45, the administration module 23 executes a process for disconnecting from the chat server.

That is, in the main routine, the toolbar 305 is displayed and processes selected by the user are carried out.

(3-1) Creation Process Subroutine

FIG. 16 is a flowchart illustrating flow of a creation process that the creation module 21 carries out wherein "Create" has been selected in the toolbar 305. When aforementioned step S35 ensues in the main routine, the following process starts.

In step S351, the creation module 21 judges whether or not either users composing a thread, or messages have been selected. If either selection is present, step S352 ensues. If neither has been selected, later-described step S354 ensues.

In step S352, the creation module 21 directs display of the confirmation window in FIG. 6 to the third input/output control module 24.

In step S353, the third input/output control module 24 stands by for either the "OK" button or the "Cancel" button being pressed. The creation module 21 is notified when the "OK" button is pressed, and step S354 ensues. Also included in the notification is the status of the "Quote Messages" checkbox. When the "Cancel" button is pressed, the creation process terminates and the flow returns to aforementioned step S33 of the main routine.

In step S354, wherein neither users composing a thread, nor messages have been selected, the creation module 21 creates and writes into the administration table thread information for a newly created thread. In particular, the thread ID is described in the thread information. Here the disclosure level may be set to "Public."

Conversely wherein either selection is present, the creation module 21 creates and writes into the administration table thread information in which selected member users or messages are described. In addition, if member users have been selected the disclosure level is set to "Private," and if messages have been selected, to "Public" respectively.

In step S355, the creation module 21 judges whether or not "Quote Messages" is checked. If "Yes," step S356 ensues; if "No," later-described step S357 ensues.

In step S356, the creation module 21 acquires requisite messages from the message list. If member users have been selected, member users' messages are acquired using nicknames. If messages have been selected, messages are acquired using message IDs.

In step S357, the creation module 21 sends the acquired messages to the third input/output control module 24. The third input/output control module 24 displays the thread window and outputs the messages within the window.

In step S358, the creation module 21 reports the created thread information to the reporting module 22. The reporting module 22 creates, and sends out to the channel via the administration module 23, a thread command reporting creation of the thread. Thereafter, the flow returns to aforementioned step S33 of the main routine.

Moreover, the process carried out wherein "Separate" has been selected on the toolbar is like the thread-creation process, and explanation therefore will be omitted.

(3-2) Link Process Subroutine

FIG. 17 is a flowchart of a linking process that the creation module 21 carries out wherein "Link" has been selected in aforementioned toolbar 305. When aforementioned step S37 ensues in the main routine, the following process starts.

In step S371, the creation module 21 directs display of the selection window shown in FIG. 10 to the third input/output control module 24. The creation module 21 also retrieves from the administration table, and sends to the third input/output control module 24, a title list for the created threads. The list of threads sent out is output to the selection window.

In step S372, the third input/output control module 24 stands by for the "OK" button to be pressed, which selects a thread. The third input/output control module 24 notifies the creation module 21 when the "OK" button is pressed. The selected threads as well as the status of the "Quote Content" checkbox are included in this notification. Step S373 then ensues. If the "Cancel" button is pressed, the linking process terminates.

In step S373, the creation module 21 judges whether or not the "Quote Content" checkbox has been checked. If "Yes," step S374 ensues. If "No," later-described step S380 ensues.

In step S374, the creation module 21 reports IDs for the selected threads to the administration module 23. The administration module 23 acquires messages contained in the reported threads from the message list using the thread IDs. The administration module 23 also rearranges the acquired messages in accordance with predetermined criteria. They can be rearranged, for example, in a time sequence, or rearranged user-by-user. The administration module 23 sends the rearranged messages to the creation module 21.

In step S375, the creation module 21 directs to the third input/output control module 24 display of a new thread window for displaying the linked threads.

In step S376, the creation module 21 sends the rearranged messages to the third input/output control module 24. The third input/output control module 24 displays the received messages in the new thread window.

In step S377, the creation module 21 consults the administration table to judge whether or not a window for link source threads is being displayed. If it is being displayed, instruction is to the third input/output control module 24 not to display the link-source window. Wherein this instruction is present, the third input/output control module 24 eliminates the link-source window.

In step S378, the creation module 21 updates the administration table. That is, it writes into the new entries predetermined information relating to the linked threads (FIG. 11). In addition, wherein the link source threads are not to be displayed in aforementioned step S377, the creation module 21 changes the "Status" of the link source threads.

In step S379, the creation module 21 reports to the reporting module 22 that threads have been linked. The reporting module 22 sends out thread commands that report link source thread IDs and forwarding destination thread IDs. Wherein, for example, user "Jun-Jun" links thread IDs "Th1" and "Th2," a thread command example would be as follows.

Th$_{13}$ merge Th1,Th2;Th3;Creator=Jun-Jun

If "No" is judged in aforementioned step S373, step S380 ensues. In step S380, a new thread window display instruction for displaying the linked threads is to the third input/output control module 24. In response to the instruction, the third input/output control module 24 displays the new thread window.

(3-3) Cancellation Process Subroutine

FIG. 18 is a flowchart of processes in a cancellation process subroutine executed wherein "Cancel" has been selected in aforementioned toolbar 305. When aforementioned step S41 in the main routine ensues, the process here below begins.

Initially, in step S411, the creation module 21 instructs to the third input/output control module 24 display of a selection window similar to FIG. 12. Preceding the instruction the creation module 21 acquires from the administration table the title list for the threads, which it sends along with the instruction to the third input/output control module 24. In accordance with the instruction, the third input/output control module 24 displays a selection window. When the "Cancel" button is pressed, the cancellation process terminates.

In step S412, when a thread selection is made and the "OK" button is pressed, the third input/output control module 24 reports to the creation module 21 the selected thread ID.

In step S413, the creation module 21 deletes the entry for the reported thread ID from the administration table.

In step S414, the creation module 21 deletes the aforementioned cancelled thread ID from the message list.

In step S415, the creation module 21 reports cancellation of the thread to the reporting module 22. The reporting module 22 sends out a thread command reporting the thread cancellation--a thread command as below, for example.

Th_delete;ThID=Th1;creator=Jun-Jun;User=Jun-Jun, ohtsuka,jormiya;private

The process flow then returns to aforementioned step S33 of the main routine.

Herein, in case the cancelled thread is a linked thread, if when the link was made the link source threads were set to "Don't Display," it is desirable to once again make the status of the link source threads "Display." Therein, at first the creation module 21 consults the administration table and executes a decision as to whether the cancelled thread is a link thread or not. This decision is executed preceding aforementioned step S413. Wherein it is a link thread, the creation module 21 consults the link source thread status and if the status is "Don't Display," changes it to "Display." The creation module 21 also acquires messages in the link source threads from the message list. The creation module 21 then causes the link source threads to be displayed by sending an instruction for display of the link source threads, and the acquired messages, to the third input/output control module 24. Presumably, when the threads are linked, the status of the link source threads is to be stored in memory, and if a linked thread is cancelled, the link source threads are returned to the stored state.

(3-4) Displaying Process Subroutine

FIG. 19 is a flowchart of a display process subroutine that the creation module 21 carries out wherein "Display" has been selected in aforementioned toolbar 305. When aforementioned step S43 ensues in the main routine, the process here below starts.

In step S431, the creation module 21 directs display of the FIG. 12 selection window to the third input/output control module 24. Preceding the instruction, the creation module 21 also retrieves a thread title list from the administration table, which it sends together with the aforementioned instruction to the third input/output control module 24. The third input/output control module 24 displays a selection window in accordance with the instruction.

In step S432, when any thread has been selected and the "OK" button is pressed, the third input/output control module 24 reports the selected thread to the creation module 21. Step S433 then ensues. When the "Cancel" button is pressed, the displaying process terminates.

In step S433, the creation module 21 specifies IDs for the selected threads. The creation module 21 then acquires messages in the selected threads from the message list using the thread IDs.

In step S434, the creation module 21 sends an instruction for thread window display, and the acquired messages, to the third input/output control module 24. The third input/output control module 24 displays the thread window, and outputs the messages within the window.

In step S435, the creation module 21 changes the "Status" of the aforementioned displayed thread in the administration table to "Display." The flow then returns to aforementioned step S33 of the main routine.

Other Embodiments (a) In aforementioned FIG. 7, messages that have been displayed in thread window 307 are also displayed in chat window 303. The setting, however, can be such that messages displayed in thread window are not displayed in the chat window. Preferably, the settings are such that the user can make them.

(b) In the aforementioned first embodiment, the disclosure level is set automatically, but the user may set the disclosure level with every thread creation. In that case, presumably, a button for setting the disclosure level would be provided in the aforementioned confirmation window of FIG. 6.

(c) In the aforementioned first embodiment, transmission/reception of thread information is carried out via a chat client, but may be carried out among display control devices directly.

(d) For the situation in which a user that has linked threads issues messages to the thread window, a configuration is conceivable wherein other users' display control devices display the messages in all windows for those link source threads. Further, the text display method may be varied so as to distinguish the messages in the link threads.

(e) Wherein threads are created, it is possible to make all members' display the same by sending to the selecting parties the selected message ID together with the thread creation command.

Various details of the present invention may be changed without departing from its spirit nor its scope. Furthermore, the foregoing description of the embodiments according to the present invention is provided for illustration only, and not for the purpose of limiting the invention as defined by the appended claims and their equivalents.

What is claimed is:

1. A display method utilized in a chat system in which users on information terminals share a network, enabling text conversation between the users in a chat session, the display method comprising:
   creating groups of the users during the text conversation based on at least one of selection of chat devices of users in the groups and selection of messages sent by users in the groups;
   identifying messages directed to the chat session based on whether the messages were sent by users in the groups;
   sharing information identifying the created message groups with the users of the chat session;
   sending messages to the chat session; and
   in accordance with the identifying displaying those of the messages that were sent by users in the groups independently of other of the messages directed to the chat session.

2. A display device utilized in a chat device wherein, sharing a network, conversation between users in a chat session by transmission/reception of text messages is possible, the display device comprising:
   identifying means for identifying messages directed to the chat session based on whether the messages were sent by groups of the users, where the groups of the users were created during the conversation based on at least one of selection of devices of users in the groups and selection of messages sent by users in the groups;
   reporting means for transmitting/receiving information identifying the created message groups among the users of the chat session;
   memory means for storing the message group identifying information; and
   input/output control means for obtaining the message group identifying information and in accordance with the message identifying, enabling display of those of the messages that were sent by users in the groups independently of other of the messages sent to the group.

3. The display control device set forth in claim 2, wherein the identifying means accepts operations directed to the message group and updates the message group information.

4. The display control device set forth in claim 2, wherein said input/output control means further accepts messages in which the message group is selected and acquires from the network or sends to the network messages to the message group.

5. The display control device set forth in claim 2, further provided with a message-list correlating messages within the network and message identifying information specifying the messages; wherein
   said identifying means creates, based on selection of the messages from a user, a message group containing senders of the selected messages and message group information containing message-identifying information for the selected messages.

6. The display control device set forth in claim 2, wherein the identifying means creates message group information in which a disclosure level of the created message groups is contained.

7. The display control device set forth in claim 2, wherein message-group identifying information specifying the message groups is contained in the message group information.

8. The display control device set forth in claim 2, wherein the input/output control means judges based on the message group information whether to display the message groups, and displays the message groups based on the judgment.

9. A display control device utilized in a chat device wherein, sharing an identical network mutually, transmission/reception of text messages is possible, the display control device comprising:
   creating means for correlating messages on the network based on user instructions and creating message groups and predetermined message group information relating to the message groups;
   reporting means for transmitting/receiving the created message group information to and from other among display control devices on the network;
   memory means for storing the message group information; and
   input/output control means for obtaining the message groups from the chat device and in accordance with instructions from users, enabling display of the message groups independently of messages within the network, wherein said creation means correlates messages within the network based on selection of the chat device from a user, and creates message groups out of messages from the selected chat devices and message group information containing information specifying the selected chat devices.

10. A computer-readable recording medium on which is recorded a display program utilized in a chat device for sharing a network and allowing conversation between users in a chat session by transmission/reception of text messages, the program performing a process comprising:

creating groups of the users during the text conversation based on at least one of selection of devices of users in the groups and selection of messages sent by users in the groups;

identifying messages on the network directed to the chat session based on whether the messages were sent by users in the groups;

transmitting/receiving information identifying the designated message group among the users of the chat session;

storing the message groups identifying information; and obtaining the message groups identifying information and in accordance with message identifying, displaying those of the messages that were sent by users in the groups independently of other of the messages directed to the chat session.

11. A method, comprising:

creating subgroups of a set of users associated with a chat session, where the subgroups comprise subsets of the set of users associated with the chat session, where the creating is based on at least one of selection of devices of users in the subgroups and selection of messages sent by users in the subgroups; and indicating that messages submitted to the chat session were submitted by members of the subgroups.

12. A method according to claim 11, wherein the indicating comprises displaying messages from users in the subgroups separate from messages from the set of users directed to the chat session.

13. A method according to claim 11, wherein the indicating comprises displaying the messages submitted by members of the subgroups differently than messages submitted by users that are not members of the subgroups.

14. A method according to claim 11, wherein the indicating comprises:

determining one of two display areas in which to display a message based on whether the message was submitted by a member of the subgroups of users.

15. A method, comprising:

creating first subsets of users from among a set of users based on selecting messages or devices of the first subsets of users, where the set of users comprises the first subsets of users and a second subset of users, where the first subsets of users and the second subset of users are disjoint, and where the users in the set of users are associated with a chat conversation channel;

displaying, in a common display area, messages submitted to the chat conversation channel by users in the second subset of users and messages submitted by users in the first subsets of users; and displaying, in both the common display area and in a group display area, messages submitted to the chat channel only by users in the first subsets of users.

16. A method of displaying messages submitted to a chat conversation channel, comprising:

creating first subsets of users from among a set of users, where the set of users comprises the first subsets of users and a second subset of users, based on selection of messages or devices of the first subsets of users, where the first subsets of users and the second subset of users are disjoint, and where the users in the set of users are associated with the chat conversation channel;

displaying in a common display area all messages submitted to the chat conversation channel; and indicating whether one of the messages was submitted by a user in the first subsets of users.

17. A method according to claim 16, wherein the indicating comprises determining whether the user who submitted the message is a member of the first subsets of users, and when it is so determined displaying the message in a display area separate from the common display area.

18. A method according to claim 17, wherein the indicating comprises displaying the message in a display area separate from the common display based on whether the user who submitted the messages is a member of the first subsets of users.

19. A display control method utilized in a chat system in which users on information terminals share identical networks mutually, enabling text conversation, the display control method:

correlating messages within the network based on user instructions and creating message groups and predetermined message group information relating to the message groups, where the message groups are created based on selection of the messages from a user, message groups containing the selected messages and message group information containing message-identifying information for the selected messages;

sharing the created message group information with users within the network;

sending messages to the message groups out to the network; and in accordance with user instructions displaying the message groups independently of messages within the network.

20. A computer-readable recording medium on which is recorded a display control program utilized in a chat device wherein, sharing an identical network mutually, transmission/reception of messages through text is possible, the computer-readable recording medium on which is recorded the display control program for executing a process comprising:

correlating messages on the network based on instructions from a user;

creating message groups and predetermined message group information relating to the message groups by at least one of designating the chat devices of the users in the groups and designating messages transmitted by users in the groups;

transmitting/receiving the created message group information among other chat devices within the network;

storing the message group information; and obtaining the message groups from the chat device and in accordance with instructions from users displaying the message groups independently of messages within the network.

* * * * *